United States Patent [19]

Werle

[11] Patent Number: 5,502,562
[45] Date of Patent: Mar. 26, 1996

[54] METHOD AND APPARATUS FOR ABSOLUTE INTERFEROMETRY USING A MEASUREMENT BEAM AND A REFERENCE BEAM HAVING PARALLEL WAVE FRONTS AND SHARING A SINGLE BEAM PATH

[75] Inventor: Peter Werle, Farchant, Germany

[73] Assignee: Franhofer-Gesellschaft Zur Forderung Der Angewandten Forschung E.V., Germany

[21] Appl. No.: 313,734

[22] Filed: Sep. 27, 1994

[30] Foreign Application Priority Data

Sep. 30, 1993 [DE] Germany ............ 43 33 423.7

[51] Int. Cl.$^6$ .................... G01B 9/02
[52] U.S. Cl. .................... 356/349; 356/358
[58] Field of Search .................... 356/358, 349, 356/345, 28.5

[56] References Cited

U.S. PATENT DOCUMENTS

| 4,715,706 | 12/1987 | Wang | 356/28.5 |
| 4,729,653 | 3/1988 | Kobayashi | 365/4.5 |
| 5,412,474 | 5/1995 | Reasenberg et al. | 356/349 |

FOREIGN PATENT DOCUMENTS

| 3528259 | 8/1985 | Germany. |
| 3836174 | 10/1988 | Germany. |
| 4035373 | 11/1990 | Germany. |

OTHER PUBLICATIONS

Pfeifer and Thiel, May 1993, Absolute Interferometry with Tunable Semiconductor Lasers, Technisches Messen 60: 185–191.

Primary Examiner—Samuel A. Turner
Assistant Examiner—Robert Kim
Attorney, Agent, or Firm—Eckert Seamans Cherin & Mellott

[57] ABSTRACT

A method and apparatus are disclosed for implementing absolute interferometry with radiation generated by diode laser whereby relative or absolute distance measurement can be performed without need of a reference interferometer, with only a single detector, and with high precision determination of the length of the measurement distance. The method comprises modulating the radiation generated by the diode laser in such a way that the diode laser is frequency-modulated at at least one discrete frequency, which then is detected with a known phase-sensitive detection method. Due to the modulation of the original radiation of the diode laser, a second laser beam is in effect produced, with the result that a single beam path includes a measurement beam and a reference beam. Each of these beams, i.e. the measurement beam and the reference beam, is at a different frequency, but the two have parallel wave fronts, pass along exactly the same optical path in the unitary beam, and interfere at the single detector. The length of the measurement distance is then found by a determination of phase shift or determination of the phase change of the modulation signal. Alternatively, the modulation frequency of the diode laser can be changed until the detector shows that a predetermined phase shift between the original first beam of the diode laser and the second, modulation-produced beam, with altered frequency, exists or has been passed through. By determining the modulation frequency at which the predetermined phase shift is reached, and taking the difference between this and the initial modulation frequency, the absolute length of the measurement distance can be found.

9 Claims, 3 Drawing Sheets

METHOD AND APPARATUS FOR ABSOLUTE INTERFEROMETRY USING A MEASUREMENT BEAM AND A REFERENCE BEAM HAVING PARALLEL WAVE FRONTS AND SHARING A SINGLE BEAM PATH

FIELD OF THE INVENTION

The present invention relates to a method and apparatus for absolute interferometry and in particular to absolute interferometry with radiation generated by a diode laser.

DESCRIPTION OF THE PRIOR ART

It is known that distances can be determined statically on the basis of absolute interferometry with tunable semiconductor lasers, without displacing a measurement reflector as is necessary with Michelson interferometers. In absolute interferometry with tunable semiconductor lasers the interference phase is changed by continuously changing the laser wavelength. This phase change is set in relation to a phase change measured in a reference interferometer with constant wavelength. On the basis of the known reference distance, the absolute distance between detector and reflector can then be calculated.

An absolute interferometric method of this kind has been described, for example, by T. Pfeifer and J. Thiel in "Technisches Messen" 60 (1993), Number 5, pp. 185–191.

In length measurement by absolute interferometry, the wavelength of a semiconductor laser is continuously tuned, such that the laser wavelength is changed, for example, from $\lambda_1$ to $\lambda_2$ with no mode jump. In the case of a semiconductor laser, such tuning can be done, for example, by applying a variable injection current. For a given absolute distance $L_{abs}$ of the measurement mirror, the following relationships apply for the wavelengths $\lambda_1$ and $\lambda_2$:

$$L_{abs}=(m_1+\Psi_1)\lambda_1/2=\phi_1\lambda_1/2$$

$$L_{abs}=(m_2+\Psi_2)\lambda_2/2=\phi_2\lambda_2/2$$

When each of the above equations is multiplied by the other wavelength and the two are subtracted, the result is:

$$L_{abs} = (\phi_1 - \phi_2)\cdot \frac{1}{2} \cdot \frac{\lambda_1 \cdot \lambda_2}{\lambda_2 - \lambda_1} = \Delta\phi \cdot \frac{\Lambda_B}{2}$$

where $$\Lambda_B = \frac{\lambda_1 \cdot \lambda_2}{\lambda_2 - \lambda_1}$$

and $\Lambda_B$ is the beat wavelength.

Because the wavelengths $\lambda_1$ and $\lambda_2$ of the semiconductor laser being used in each case cannot be set exactly reproducibly without additional measures, the beat wavelength $\Lambda_B$ varies. The reason for its great variation is that the fraction used to calculate it has the small wavelength difference $(\lambda_2-\lambda_1)$ in the denominator. In the present state of the art, therefore, it is necessary to perform a length comparison with a reference interferometer of constant length.

This known method of absolute interferometry employing an additional reference interferometer with constant length is based on detecting the interference phase change in both the measurement and the reference interferometer during the continuous wavelength tuning. If the length of the reference distance $L_{ref}$ is known, the measurement distance $L_{abs}$ can be found from the phase change for the reference distance $\phi_{ref}$ and the phase change for the measurement distance $\phi_{abs}$ according to the following equation:

$$L_{abs} = L_{ref} \frac{\Delta\phi_{abs}}{\Delta\phi_{ref}}$$

In this method it is not essential to know the wavelengths and their separation $\Delta\lambda$, and the measurement uncertainty becomes dependent merely on the accuracy of the phase measurement and the determination of reference distance length.

It should be noted that as the range of wavelengths through which the laser is tuned increases, the relative uncertainty of the phase measurement is reduced.

The tunability of a semiconductor laser, however, is limited, depending on the concrete forms taken by the pn-junction and the laser resonator.

Implementation of the absolute interferometric method described above is more costly in optical-mechanical terms because of the need for a reference interferometer or a reference distance.

SUMMARY OF THE INVENTION

The object of the present invention is to provide a method and apparatus for absolute interferometry with radiation generated by diode laser that enables relative or absolute distance measurement without a reference interferometer, and wherein the beat wavelength $\Lambda_B$ is constant. It is also a prerequisite that high-resolution phase measurement with correspondingly precise determination of the measured distance can be achieved.

According to a first aspect of the present invention there is provided a method of absolute interferometry for determining the length of a measurement distance wherein radiation is generated by a diode laser, and the measurement distance comprises the change in distance between the diode laser and a reflector as determined by means of a detector, and comprising the steps of high-frequency modulating the radiation v1 of the diode laser in such a way that in the frequency range separated from a carrier frequency by an amount corresponding to a modulation frequency vm at least one quasi resulting side band vs is produced with vs=v1+vm, so that the diode laser in addition to the original first beam quasi simultaneously generates a second beam with altered frequency but parallel wave fronts, the first and second beam each pass along the same optical path within a single optical beam, and the first and second beam interfere with one another at the detector; and measuring the phase shift $\Delta\phi$, comprising the phase difference between the detector signal and a modulation reference signal, as a measure of the change in the length comprising the measurement distance.

According to a second aspect of the invention there is provided apparatus for absolute interferometry for determining the length of a measurement distance wherein radiation is generated by a diode laser, comprising a diode laser emitting radiation at a carrier frequency;

control means to operate the diode laser;

a radiation detector;

a modulator for high-frequency modulation of the radiation of the diode laser to produce radiation at a sideband frequency, the carrier frequency radiation and the modulated radiation together travelling over the same measurement distance to arrive at the detector where they interfere; and a phase-sensitive detector with a first input connected to an output of the detector, a second reference input supplied with the modulation reference frequency of the modulator, and an output which supplies a signal representing a phase difference which is correlated with the length of the measurement distance.

It will be appreciated that in the invention radiation generated by a diode laser is modulated in such a way that the diode laser is frequency-modulated at at least one discrete frequency, which is then detected by a conventional phase-sensitive detection method. The modulation of the original radiation of the diode laser in effect produces a second laser beam, with the result that a measurement and a reference beam coexist in a single beam path. Although the frequencies of the two beams are different, the beams have parallel wave fronts, pass along exactly the same optical path and interfere at a single detector. The beat wavelength thus depends only on the modulation frequency, which can be adjusted very precisely and accurately with known frequency generators, such as quartz oscillators.

Thus, invention provides a new method of absolute interferometry in which the phase shift of a modulation signal is measured and the diode laser or the radiation it generates has only a carrier function and unambiguously determines the measurement distance. It is within the scope of the invention for the method to be implemented with or without a reflector mirror, the measurement distance in the absence of a reflector mirror being defined by the distance between the diode laser and the detector.

Preferably, the intensity of the measured signals is normalized with respect to the radiation power at the detector. In this way the measurement cannot be affected by undesired absorption in the optical beam path.

With the method and apparatus in accordance with the invention and the arrangement the beat wavelength $\Lambda_B$ is made constant, which is not achieved in the present state of the art as described above. Owing to a high-resolution phase measurement $\Delta\phi$, limited only by noise or quantization errors in whatever analog-digital converter is used, the measurement precision can be considerably increased. Because tuning of the diode laser is no longer necessary, errors arising from fluctuations or parameter changes during the tuning period are excluded at the outset. Therefore relative measurements can be performed with constant system parameters such as laser current, laser temperature and laser modulation, because all that is required is electronic measurement of a phase change.

According to a third aspect of the invention there is provided a method of absolute interferometry for determining the length of a measurement distance wherein radiation is generated by a diode laser, and the measurement distance comprises the absolute distance between the diode laser and a reflector as determined by means of a detector, and comprising the steps of modulating the radiation of the diode laser whilst simultaneously altering the modulation frequency from $v1$ to $v2$ until the detector shows a phase shift of $2\pi$ between an original first beam of radiation from the diode laser and a second beam of radiation produced by the modulation, the first and second beams of radiation having different frequencies but parallel wave fronts which travel along the same optical path;

measuring the modulation frequency $v2$ at which the phase shift of $2\pi$ is reached and subtracting therefrom the initial modulation frequency $v1$ to obtain a frequency change $\Delta v$ in accordance with the equation $\Delta v = v1 - v1$; and determining the absolute measurement distance L by calculation in accordance with the equation $$L = c/(2 \cdot 66\, v),$$

where c is a constant equal to the velocity of light in the medium.

Thus, absolute measurements can be carried out by changing the modulation frequency over a predetermined range, the absolute measurement distance then being determined by frequency measurement, which can be performed with high accuracy by known methods. If it is necessary for the direction of a displacement to be detected, this is advantageously accomplished by the electronic production of signals phase-shifted by 90°, 180° and/or 270° and with only a single detector.

The present invention will now be described by way of example with reference to accompanying drawings.

DESCRIPTION OF THE PREFERRED EMBODIMENTS

Figure 1:
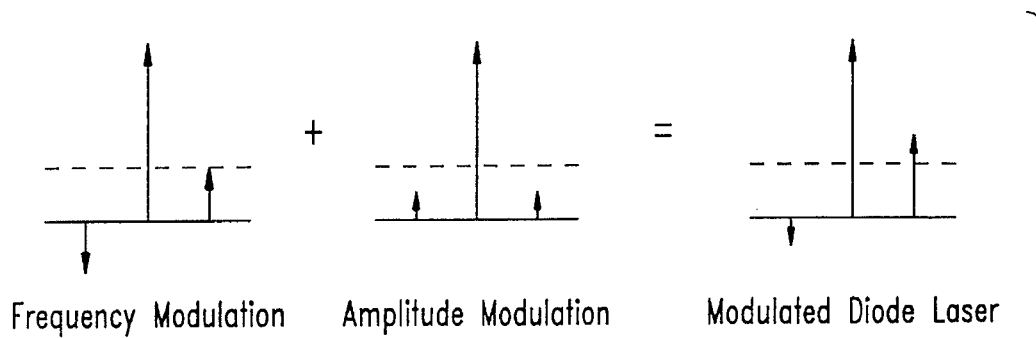
FIG. 1 is a diagram showing a simplified arrangement of apparatus to determine the change in length of a measurement distance using a method according to the invention.
Figure 1:
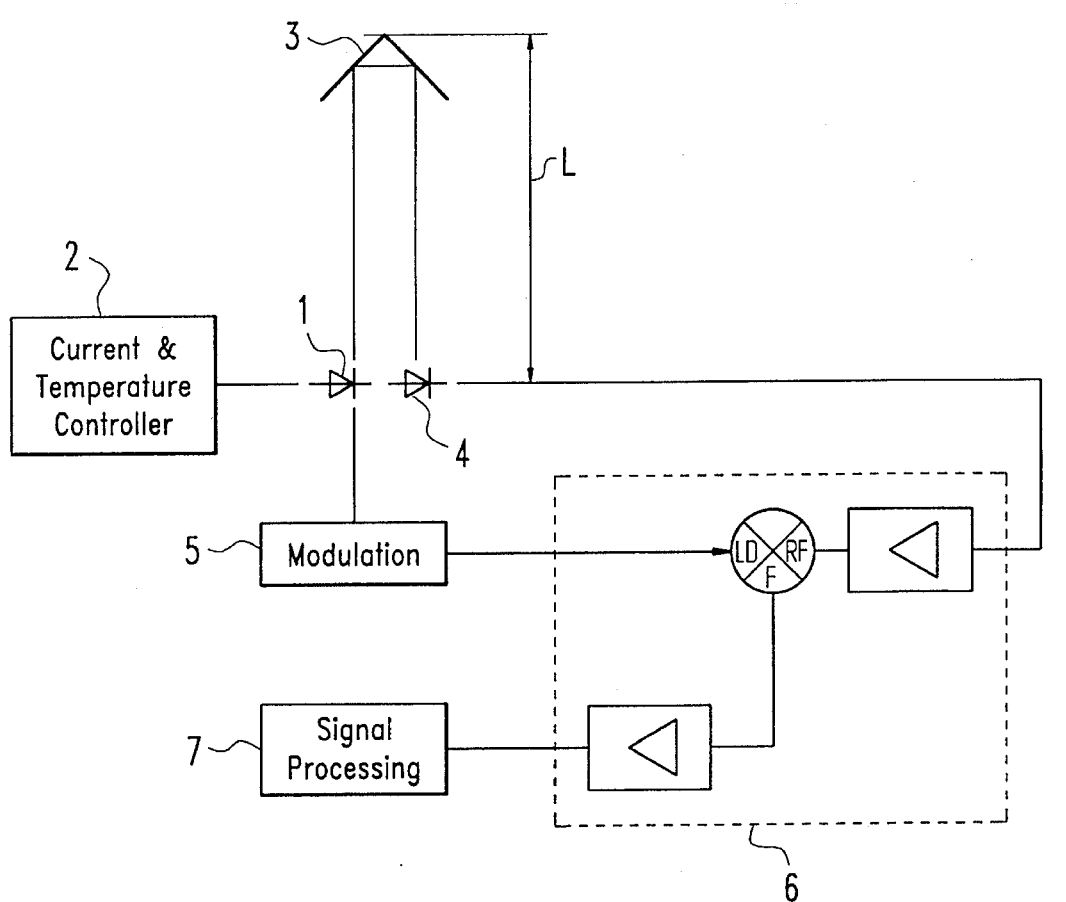

In the apparatus to determine the change in length of a measurement distance using the method of absolute interferometry according to the invention, a diode laser 1 is controlled with respect to injection current, temperature and pn-junction by a control unit 2. The laser radiation from the diode laser 1 is directed to a (retro)reflector 3 and from there back to a detector 4. The measured distance L is defined by the separation between the (retro)reflector 3 and detector 4. The diode laser 1 is frequency-modulated by way of a modulator 5. The modulation of the radiation $v1$ of the diode laser is such that at least one sideband $vs$ is produced in the frequency range separated from the carrier by an amount corresponding to the modulation frequency $vm$. As a result of such modulation, in addition to the original first beam a virtual second beam is produced at a different frequency, but with parallel wave fronts, such that the first and second beams each pass along the same optical path and the two beams interfere at the detector 4. The output of the detector 4 is connected to the first input of a phase-sensitive detector 6, to the second input of which is applied a modulation reference signal from the modulator 5.

The phase-change signal, which appears at the output of the phase-sensitive detector 6, is evaluated using a signal-processing unit 7 in such a way that the change in magnitude of the measured distance L can be determined.

The phase-sensitive detector 6 can, for example, take the form of a lock-in amplifier or a double-balanced mixer.

By means of the modulator 5, the diode laser 1 or its carrier frequency ν1 is modulated in such a way that in the frequency range separated from the carrier frequency by the modulation frequency νm there is produced at least one sideband νs=ν1 +λm, or $$\frac{1}{\lambda_2} = \frac{1}{\lambda_1} + \frac{1}{\Lambda_B}$$

Accordingly, the beat wavelength $$\Lambda_B = \frac{\lambda_1 \cdot \lambda_2}{\lambda_2 - \lambda_1} = \frac{c}{\nu m}$$

depends only on the modulation frequency λm, which can be produced within the modulator 5 by a highly precise frequency-stabilized generator.

The limit of precision of measurement of the length L is given by $\Delta L_{min} = \Delta\phi_{min} \cdot \Lambda_B/2$.

By means of phase-sensitive detection, phase changes $\Delta\phi_{min}=10^{-3}$ can be measured. This can be done, for example, with a 12-bit analog-to-digital converter with a resolution of 1/4096.

In the following table minimal detectable length changes or precisions are shown for the phase resolutions $\Delta\phi_{min}$ of $10^{-3}$ and $10^{-4}$ as a function of the modulation frequency νm. For larger or smaller phase resolutions, the values can be correspondingly scaled, and likewise for other modulation frequencies νm.

| $\nu_{mod}$ | $\Lambda_B$ | $\Delta L_{min}$ ($\Delta\phi_{min} = 10^{-3}$) | $\Delta L_{min}$ ($\Delta\phi_{min} = 10^{-4}$) |
|---|---|---|---|
| 1 Mz | 300 m | 150 mm | 15 mm |
| 10 MHz | 30 m | 15 mm | 1.5 mm |
| 100 MHz | 3 m | 1.5 mm | 150 μm |
| 1 GHz | 30 cm | 150 μm | 15 μm |
| 10 GHz | 3 cm | 15 μm | 1.5 μm |

Figure 2:
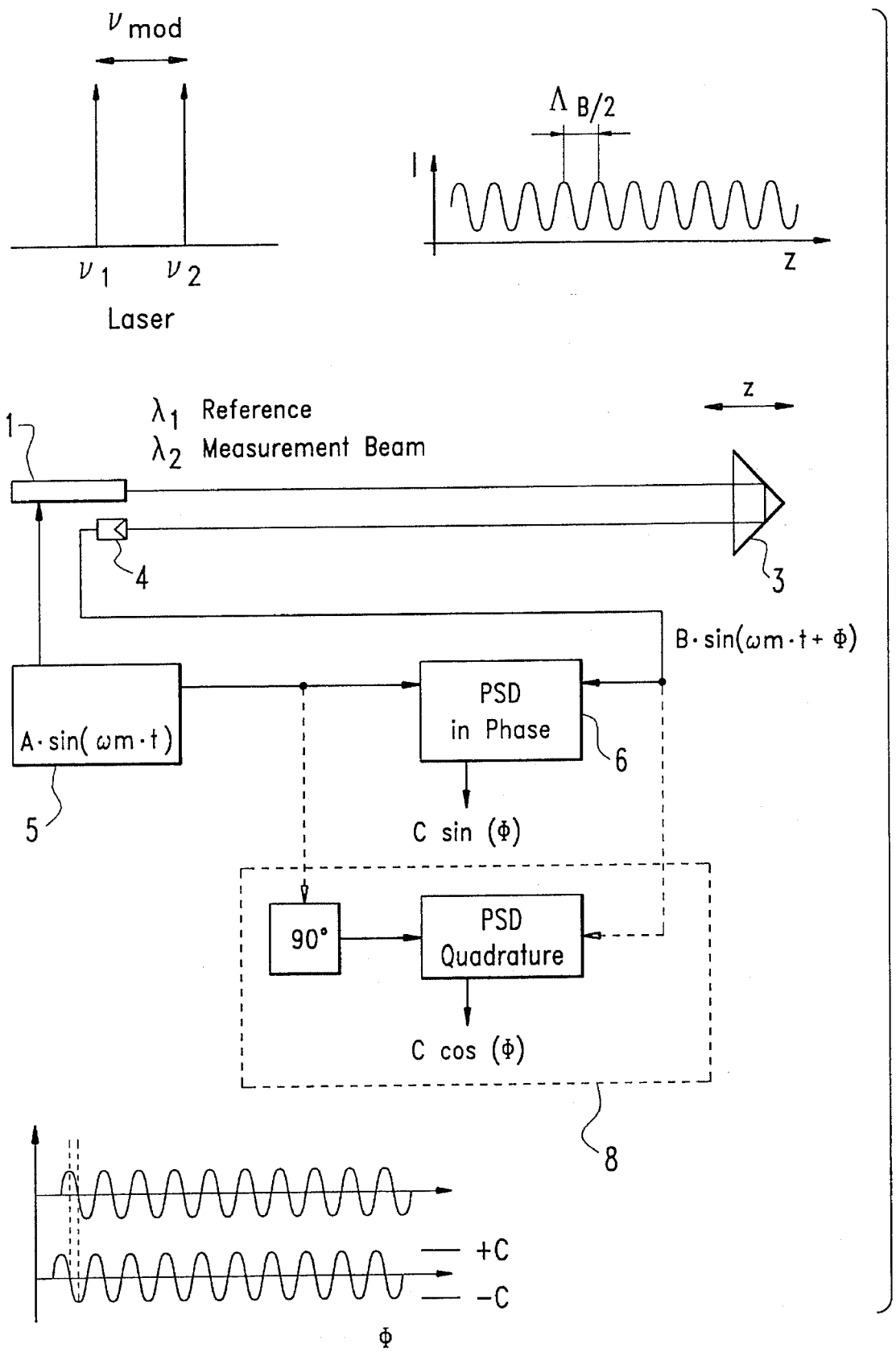
FIG. 2 is a diagram showing a simplified arrangement of apparatus to determine the change in length of a measurement distance with a simultaneous determination of the direction of the change.

FIG. 2 shows a second embodiment of apparatus arranged to determine the change in magnitude of a measured distance with the option of directional determination in accordance with the invention.

Here the measured distance changes by a given amount in a given direction z. As in the first embodiment, a diode laser 1 is provided, the radiation from which is incident on a retroreflector 3 and then is received by a detector 4. The modulator 5 produces a modulation signal A·sin(ωm·t) which, as in the first example, is also sent to the reference input, i.e. the second input, of the phase-sensitive detector 6. The output of the detector 4 is connected to the first input of said phase-sensitive detector 6.

The modulated laser beam passes through the measurement distance and on reaching the detector 4 generates a beat signal B·sin(ωm·t+φ). This signal has a frequency corresponding exactly to the modulation frequency but phase-shifted by the amount φ. At the output of the phase-sensitive detector 6, after a mixing process and suitable filtering, there thus appears a d.c. voltage C·sin(φ), the level of which depends on the phase φ. As the phase changes from 0 to 2π, the voltage level varies over a range of 2C. The change in level can be determined as either an analog or a digital quantity, after suitable amplification, and represents the desired measured variable.

For relative measurements it is necessary to detect the direction of the change as well. For this purpose the detector output signal is split into two or more equal components and passed to two or more phase-sensitive detectors, the reference signals of the phase-sensitive detectors being phase-shifted by 90°, 180° or 270°

In the embodiment according to FIG. 2 a second phase-sensitive detector 8 is provided, to the second input of which is sent a reference signal phase-shifted by 90°. To the first input of the second phase-sensitive detector 8 is applied the output signal of the detector 4. By comparison of the output signals of the first and second phase-sensitive detectors 6, 8, which carry the in-phase signal and a quadrature signal, the direction z of the measured change can be determined electronically.

It is within the scope of the invention that the retroreflector 3 can be eliminated, in which case the measurement segment is defined by the diode laser 1 and, opposite it, the detector 4.

The method in accordance with the invention is advantageously implemented by way of semiconductor lasers, because these can be modulated into the gigahertz region, e.g. by means of the injection current.

For instance, if high-frequency modulation is used, with a modulation frequency of ca. 100 MHz, for a modulation index of β<1 an upper and a lower sideband with opposite phases are produced, each separated from the carrier by an amount corresponding to the modulation frequency. This is shown symbolically in the upper part of FIG. 1.

Given that the detector 4 has sufficiently broad-band characteristics, signals are now produced at all frequencies produced by the mixing, including the modulation frequency. Because the upper and lower side bands are of opposite phase, the output currents of the detector also exhibit a phase shift of 180° at the modulation frequency, so that with phase-sensitive detection the two signals cancel one another, giving a net zero signal.

When semiconductor lasers are modulated directly by way of the injection current, however, as shown symbolically in the previously mentioned upper part of FIG. 1, frequency modulation is always coupled to amplitude modulation. That is, as charge carriers are periodically injected into the pn-junction of the diode laser by way of a modulation current, the effect is to change both the charge-carrier density (amplitude modulation) and the refractive index in the laser resonator (frequency modulation). The result is a residual amplitude modulation corresponding to the parameters of the particular laser, which is turned to advantage in the present method.

What is obtained in practice, as shown in the upper part of FIG. 2, is a quasi one-sided band modulation representing the difference between the beat signals of the upper side band and carrier on the one hand and the lower side band and the carrier on the other hand. The maximal amplitude of the difference signal at the output of the phase-sensitive detector 4 depends on the magnitude of the above-mentioned residual amplitude modulation and hence can be used as the desired measured variable.

It is also within the scope of the invention to undertake intensity normalization of the measured signals with respect to the luminous power received at the detector, so that undesired absorptions in the beam path do not introduce error into the results of the measurement.

It is also possible for the modulator 5 to produce different kinds of modulation, namely single-tone or two-tone modulation, in which the carrier is modulated with two different frequencies and it is the difference frequency that is detected.

Because of the simple construction of the arrangement shown in the exemplary embodiments, inexpensive vibration-monitoring interferometers can be installed, e.g. for bridge structures.

With the arrangement of apparatus according to FIG. 1, therefore, relative measurements can be carried out with constant system parameters, because only the phase change is determined electronically. The operating point of the diode laser 1 is determined by the controller 2. The modulation frequency is selected to suit the actual application. What is measured, as explained above, is the phase shift $\Delta\phi$. As shown in the above table, for instance, a measured phase shift of $10^{-3}$ corresponds to a length change of 1.5 mm for a modulation frequency of 100 MHz and with c the velocity of light in vacuum.

Figure 3:
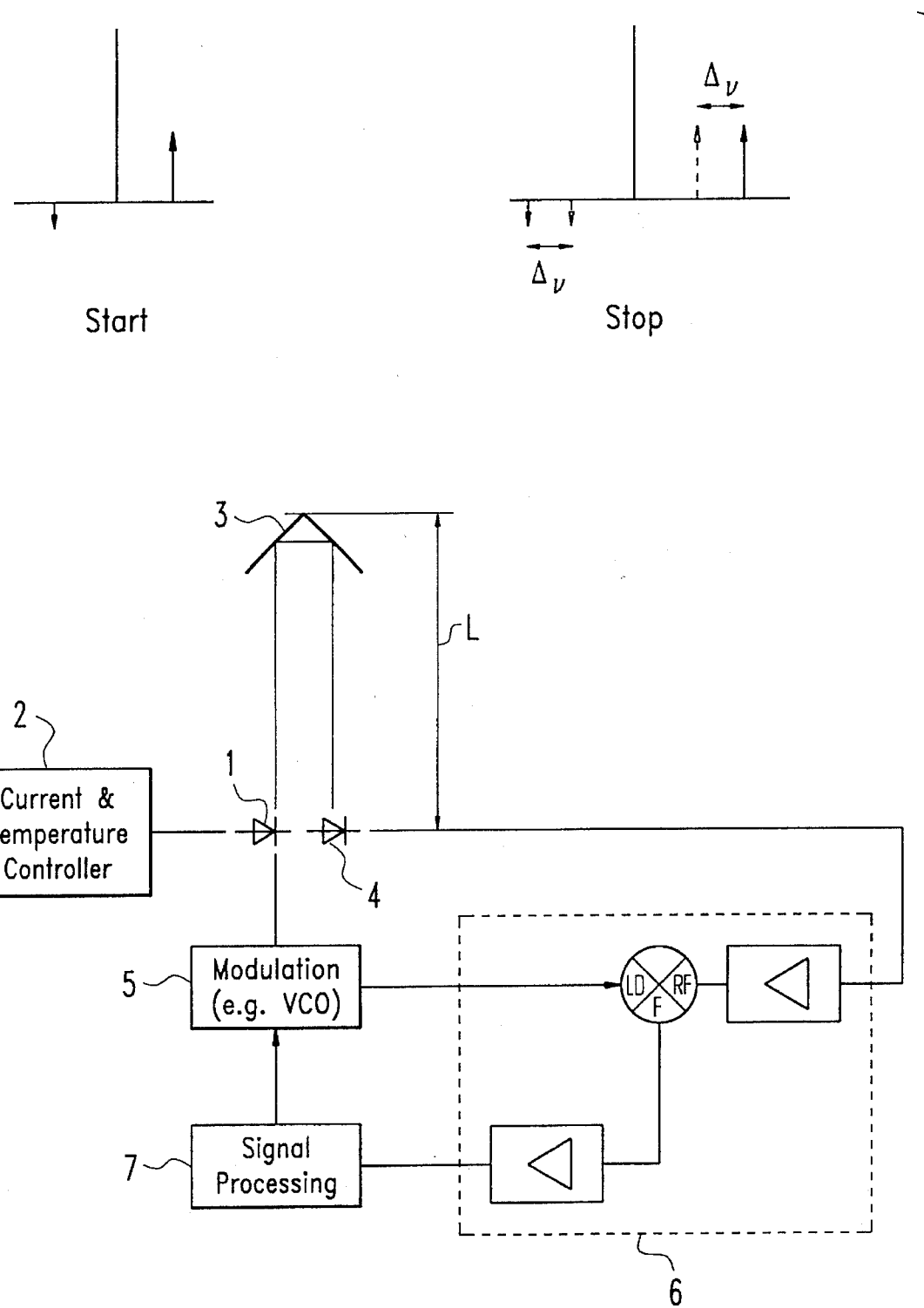
FIG. 3 is a diagram showing a simplified arrangement of apparatus to determine the absolute length of a measurement distance using a method according to the invention with variable modulation.

FIG. 3 shows an arrangement by means of which absolute measurements can be made by changing the modulation frequency of the modulator 5. This embodiment is such that the distance can be measured by way of a frequency measurement $\Delta\nu$ or phase measurement $\Delta\phi$.

For example, as shown in principle in the upper part of FIG. 3, the frequency can be increased, starting from $\nu_1$, until a phase around $2\pi$ has been passed through, i.e. $\Delta\phi=1$. From the frequency difference $\Delta\nu=\nu_2-\nu_1$ the absolute length L of the measurement distance can be found directly.

The measured length L is given by the following equation:

$$L=c/(2\cdot(\nu_2-\nu_1))=c/(2\cdot\Delta\nu).$$

In this embodiment of the invention the modulator 5 can, for example, be a voltage-controlled oscillator (VCO) under the control of the signal-processing unit 7.

From what has been said above it will be appreciated that when, for example, the modulation frequency must be tuned from 100 MHz to 110 MHz in order to pass through a phase of $2\pi$, the required frequency change corresponds to a path length of 14.99 m. The accuracy of this length determination, in accordance with the principle underlying this application, depends only on the accuracy of the phase measurement by means of the phase-sensitive detector 6. It is especially advantageous to average several phases by employing the signal-processing unit 7.

It is also possible to preset a fixed frequency change $\Delta\nu$, in which case the length can be found directly from the phase measurement $\Delta\phi$ with reference to the known fixed frequency change.

In the exemplary embodiments described herein with reference to the drawings, the change in length of the measurement segment between diode laser and reflector can be determined per unit time. That is, the velocity of the movement between diode laser 1 and reflector 3 can be measured. Furthermore, in combination with a scanner a measured object can be sampled three-dimensionally and its surface configuration determined.

Altogether, the invention makes it possible to measure relative or absolute distances in a surprising manner, by employing modulation techniques and phase-sensitive detection without a reference interferometer. Relative measurements, in particular, can be made while keeping the system parameters of the diode laser constant, which clearly simplifies the construction of a measurement arrangement based on such a principle, and as such measurement arrangements are more economical they open the way to new areas of application. Because tuning of the modulation frequency is uncritical in the case of simultaneous measurement of frequency and phase change, determination of the length of a measurement segment can reduced to a simple frequency measurement that can be implemented in a known way.

Hence the invention enables absolute interferometric measurements of high precision, on the basis of radiation generated by diode laser with no separate reference beam path and no reference detector.

The measurement and evaluation themselves are performed with purely electronic means, i.e. without mechanically moved parts such as are necessary in a conventional Michelson interferometer.

What is claimed is:

1. A method of absolute interometry for determining the length of a measurement distance wherein a first beam is generated by a diode laser, and the measurement distance is the distance between the diode laser and a reflector as determined by means of a detector, and comprising the steps of high-frequency modulating the first beam $\nu 1$ of the diode laser in such a way that in the frequency range separated from a carrier frequency by an amount corresponding to a modulation frequency $\nu m$ at least one resulting side band $\nu s$ is produced with $\nu s=\nu 1+\nu m$, so that the diode laser in addition to said first beam with the carrier frequency simultaneously generates a second beam with side band frequency but parallel wave fronts, said first and second beams each pass along the same optical path within a single optical beam, and the interference of said first and second beam with one another is measured at the detector as a corresponding detector signal; and measuring the phase shift $\Delta\phi$, comprising the phase difference between said detector signal and modulation reference signal, as a measure of the change in the length comprising the measurement distance.

2. A method as claimed in claim 1, wherein the change in the length comprising the measurement distance $\Delta L$ is determined as follows:

$$\Delta L=\Delta\phi\cdot c/(2\cdot\nu m),$$

where c is the velocity of light in the medium.

3. A method as claimed in claim 1, wherein for relative measurements the direction of the change in the length comprising the measurement distance is determined by electronically splitting the detector signal into equal parts, sending the parts to at least two phase-sensitive detectors, and phase shifting the reference signals of the phase-sensitive detectors by one of 90°, 180° and 270° so as to produce one in-phase and one quadrature signal by which the direction of the change in length can be determined.

4. A method as claimed in claim 1, wherein the radiation of the diode laser is modulated with two different frequencies and the resulting difference frequency is detected.

5. A method as claimed in claim 1, wherein the intensity of the measured signals is normalized with respect to the radiation power at the detector.

6. A method as claimed in claim 1, wherein a movement velocity between the diode laser and the reflector is determined from the change in length of the measurement distance between the diode laser and the reflector per unit time.

7. A method as claimed in claim 1, wherein a change in distance between the diode laser and the detector is determined.

8. A method of absolute interferometry for determining the length of a measurement distance wherein radiation is generated by a diode laser, and the measurement distance comprises the absolute distance between the diode laser and a reflector as determined by means of a detector, and comprising the steps of modulating the radiation of the diode laser whilst simultaneously altering the modulation frequency from $\nu 1$ to $\nu 2$ until the detector shows a phase shift of $2\pi$ between an original first beam of radiation from the diode laser and a second beam of radiation produced by the modulation, the first and second beams of radiation having different frequencies but parallel wave fronts which travel along the same optical path;

measuring the modulation frequency $v2$ at which the phase shift of $2\pi$ is reached and subtracting therefrom the initial modulation frequency $v1$ to obtain a frequency change $\Delta v$ in accordance with the equation $\Delta v = v2 - v1$; and determining the absolute measurement distance L by calculation in accordance with the equation $$L = c/(2 \cdot \Delta v),$$

where c is a constant equal to the velocity of light in the medium.

9. Apparatus for absolute interferometry for determining the length of a measurement distance wherein radiation is generated by a diode laser, comprising a diode laser emitting radiation at a carrier frequency;

control means to operate the diode laser;

a radiation detector;

a modulator for high-frequency modulation of the radiation of the diode laser to produce radiation at a sideband frequency, the carrier frequency radiation and the modulated radiation together travelling over the same measurement distance to arrive at the detector where they interfere; and a phase-sensitive detector with a first input connected to an output of the detector, a second reference input supplied with the modulation reference frequency of the modulator, and an output which supplies a signal representing a phase difference which is correlated with the length of the measurement distance.

* * * * *

UNITED STATES PATENT AND TRADEMARK OFFICE
CERTIFICATE OF CORRECTION

PATENT NO. : 5,502,562
DATED : March 26, 1996
INVENTOR(S) : Peter Werle

It is certified that error appears in the above-indentified patent and that said Letters Patent is hereby corrected as shown below:

In Column 4, below line 6, delete "$L=c/(2 \cdot 66\ v)$," and substitute therefor --$L=c/(2 \cdot \Delta v)$,--.

In Column 5, line 5, delete "$\lambda$ m" and substitute therefor --vm--.

In Column 5, line 14, delete "$\lambda$ m" and substitute therefor --vm--.

In Column 8, Claim 8, line 54, delete "$2\pi$between" and substitute therefor --$2\pi$ between--.

Signed and Sealed this

Third Day of December, 1996

Attest:

BRUCE LEHMAN

*Attesting Officer*          *Commissioner of Patents and Trademarks*